United States Patent [19]
Matsuda et al.

[11] Patent Number: 4,947,463
[45] Date of Patent: Aug. 7, 1990

[54] LASER SPRAYING PROCESS

[75] Inventors: Jun Matsuda, Takamatsu; Akihiro Utsumi, Kagawa; Munehide Katsumura, Takamatsu; Masafumi Yoneda, Takamatsu; Tetsuo Yano, Takamatsu, all of Japan

[73] Assignees: Agency of Industrial Science & Technology; Ministry of International Trade & Industry, both of Tokyo, Japan

[21] Appl. No.: 310,902

[22] Filed: Feb. 16, 1989

[30] Foreign Application Priority Data

Feb. 24, 1988 [JP] Japan .................................. 63-41764

[51] Int. Cl.$^5$ .............................................. B23K 26/00
[52] U.S. Cl. ............................ 219/121.85; 219/121.66; 219/121.84; 427/53.1
[58] Field of Search ........... 219/121.6, 121.85, 121.84, 219/121.66, 121.65, 121.63, 121.64; 427/53.1, 422; 118/300, 620; 239/79, 85

[56] References Cited

U.S. PATENT DOCUMENTS 4,200,669 4/1980 Schaefer et al. .................. 427/53.1

FOREIGN PATENT DOCUMENTS 61-163258 7/1986 Japan .
61-145494 10/1986 Japan .
61-264168 11/1986 Japan .
62-177166 8/1987 Japan .

Primary Examiner—C. L. Albritton
Attorney, Agent, or Firm—Oblon, Spivak, McClelland, Maier & Neustadt

[57] ABSTRACT

A spraying material is fed to and melted in a high energy density zone formed by converging a laser beam therein with a converging lens or a mirror, and the molten spraying material is rendered into particles by jetting a carrier gas stream such that the axis thereof crosses the axis of the laser beam in the high energy density zone to blow the particles of the molten spraying material against a base surface disposed to be normal to the carrier gas stream axis beyond the high energy density zone so as to form a film of the spraying material on the surface.

6 Claims, 5 Drawing Sheets

LASER SPRAYING PROCESS

BACKGROUND OF THE INVENTION

1. Field of the Invention

This invention relates to a laser spraying process.

2. Prior Art Statement

A laser spraying process is one in which a spraying material is supplied to and melted in a high energy density zone formed by converging a laser beam therein with a converging lens or a mirror so that the molten material is driven as particles by a carrier gas stream to a target surface to form a film of the spraying material on the surface.

Spraying processes prior to the development of the laser spraying process include a flame spraying process, a plasma spraying process and a wire explosion spraying process. With the development of the laser spraying process, it has become possible to readily form a high energy density zone to obtain a spraying material film having reliable adhesion.

Well-known laser spraying processes are disclosed in Japanese Patent Publication No. 61-45494, Japanese Patent Disclosure No. 61-163258, Japanese Patent Disclosure No. 61-264168 and Japanese Patent Disclosure No. 62-177166.

In the laser spraying process disclosed in Japanese Patent Publication No. 61-45494, a laser beam is converged by a parabolic mirror onto a base surface, and a spraying material in the form of particles is fed by a heated shield gas stream to the base surface, on which the laser beam is converged, to heat the base and spraying material so as to melt and deposit the spraying material on the base surface.

In the laser spraying process disclosed in Japanese Patent Disclosure No. 61-163258, a laser beam is converged by an optical lens onto a base surface, while a powdery spraying material is fed to and heated in the laser beam to blow the material against an area of the base surface on which the laser beam is incident, thus forming a spraying material film on the base surface.

The laser spraying processes disclosed in Japanese Patent Disclosures No. 61-264168 and 62-177166 were proposed by the inventors. These processes have the aim of increasing the adhesion between a base surface and a spraying material film formed thereon by heating the base surface with a laser beam after formation of a high energy density zone.

The above four earlier inventions are based on the concept that by feeding a molten spraying material to a preliminarily heated base surface, the adhesion between a base surface and a spraying material film formed thereon can be increased so as to reduce the separability of the spraying material film. This has been inferred from the result of past research showing that the quality of a junction formed in welding, soldering or deposition can be enhanced by preheating the base surface.

However, in order to heat the base surface with the laser beam after formation of the high energy density zone as noted above, it is necessary to provide, in addition to a carrier gas feeder, a device for leading the laser beam to the base surface, thus complicating the overall apparatus. In addition, the base surface is sometimes heated to the neighborhood of 1,400° C., and feeding the spraying material to such a heated base surface is liable to cause reaction of the material constituting the base surface and molten particles of the spraying material so as to produce undesired alloys. Further, since the base surface is heated to a high temperature, the base should not consist of a material which can be readily thermally broken or deformed.

OBJECT AND SUMMARY OF THE INVENTION

An object of the invention is to provide a laser spraying process which uses a very simple apparatus and permits ready formation of a spraying material film on a base of a material which can be readily thermally broken or deformed.

To attain the above object of the invention, there is provided a laser spraying process, which comprises the steps of feeding a spraying material to and melting it in a high energy density zone formed by converging a laser beam therein with a converging lens or a mirror and blowing the molten spraying material as particles with a carrier gas stream against a base surface to form a film of the spraying material on the base surface, the carrier gas stream having an axis set normal to the base surface, the laser beam in the high energy density zone having an axis set to cross the axis of the carrier gas stream.

According to the invention, the gas stream blown against the base surface has an axis crossing the axis of the laser beam in the high energy density zone. Thus, the spraying material is driven as particles against the base surface which is not positively heated to be deposited on the surface. Thus, the spraying material film can be formed without possibility of chemical reaction or alloying of the two materials. In addition, since the base surface is not preheated, the base may consist of a material which can be readily thermally broken or deformed. Further, since no laser beam has to be led to the base surface, the apparatus for carrying out the laser spraying process can be simplified.

The above and other objects and features of the invention will become more apparent from the following detailed description with reference to the accompanying drawings.

DETAILED DESCRIPTION OF THE PREFERRED EMBODIMENT

The inventors, having heretofore developed the laser spraying process, conducted extensive research and experiments on the preheating of a base surface in the laser spraying process, which was thought to be indispensable. As a result, it was found that without preheating the base surface a comparable adhesion of the spraying material film to the base surface could be obtained by selecting conditions for the spraying. The invention is predicated on this finding, and it will now be described with reference to the illustrated examples.

Figure 1:
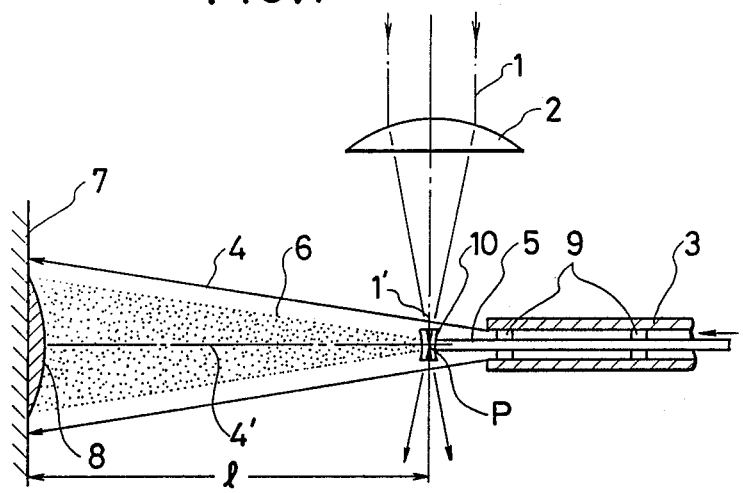
FIG. 1 is a schematic view showing a first example of the apparatus for carrying out the laser spraying process according to the invention.

FIG. 1 shows a first example of the apparatus for carrying out the invention. A laser beam 1 from a laser beam source (not shown) is converged by a converging lens 2 to form a substantially cylindrical high energy density zone 10 having a central focus point P on a beam axis 1'. A gas jet nozzle 3 is disposed such that a carrier gas stream 4 therefrom has an axis 4' crossing the axis 1' of the laser beam 1 in the high energy density zone 10 and normal to a base surface 7. A spraying material 5 in the form of a wire extends through the center of the gas jet nozzle 3 such that it is supported by guide pieces 9. It is fed by suitable means such that its free end is found in the high energy density zone 10. The inner space of the gas jet nozzle 3 constitutes a carrier gas passage, and therefore the guide pieces 9 have a shape such as not to disturb the streamline of the gas stream 4.

With the above construction, as the free end of the spraying material wire 5, which is continuously fed out from the gas jet nozzle 3, reaches the high energy density zone 10, it is momentarily elevated in temperature and made molten. The molten material is carried along with the carrier gas stream 4. During this time, it is rendered into small particles 6 to be blown against the base surface 7, which is not preheated. Thus, the particles 6 are forcibly deposited to form a spraying material film 8 on the base surface 7.

Figure 2:
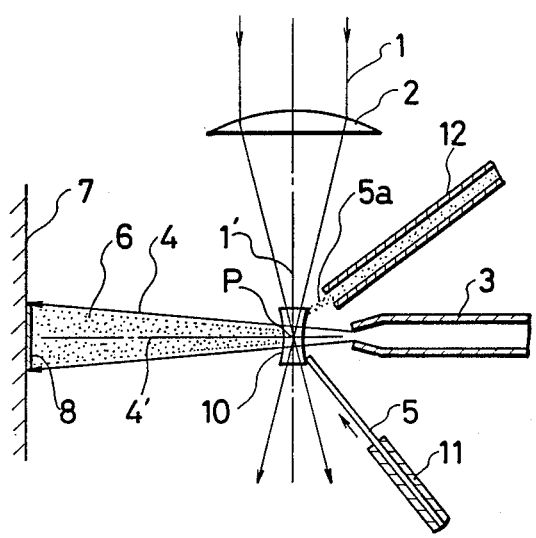
FIG. 2 is a schematic view showing a second example of the apparatus for carrying out the laser spraying process according to the invention.

FIG. 2 shows a second example of the laser spraying apparatus for carrying out the invention. In this example, a gas jet nozzle 3 and spraying material feeders 11 and 12 are provided separately. The feeder 11 feeds a spraying material wire 5 to a high energy density zone 10. The other feeder 12 feeds powdery spraying material 5a with carrier gas to the high energy density zone 10. In this example, the spraying material wire 5 and powdery spraying material 5a are fed to the high energy density zone 10 at angles to the axis 1' of the laser beam, so that their retention times in the high energy density zone are increased, whereby they can be effectively elevated in temperature and melted.

It is possible to provide a plurality of spraying material wire feeders or powdery spraying material feeders.

Figure 3:
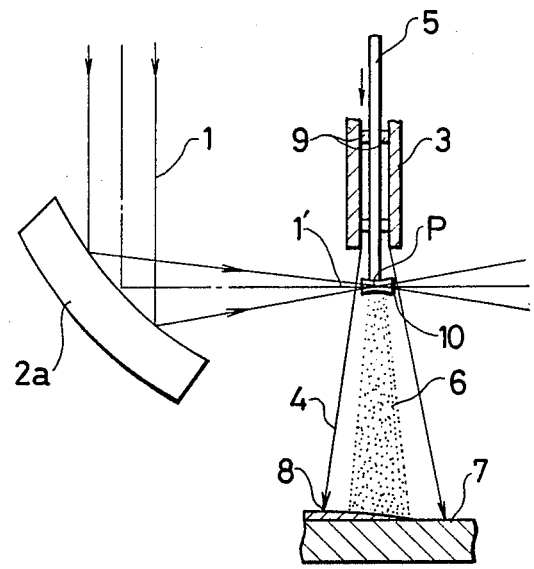
FIG. 3 is a schematic view showing a third example of the apparatus for carrying out the laser spraying process according to the invention.

FIG. 3 shows a third example of the apparatus. This example is the same as the first example shown in FIG. 1 except that a concave mirror 2a is used for converging the laser beam 1. The gas jet nozzle 3 may be of a double-tube structure, with the outer tube used as a carrier gas passage and the inner tube as a passage of the spraying material in the form of a wire or particles. It is further possible to use a three-tube structure gas jet nozzle, with the inner tube serving as a passage for the spraying material in the form of a wire or particles, the intermediate tube as a passage for a reacting gas to be reacted with the spraying material and the outer tube as a non-reactive gas passage. In this case, molten material particles are driven to the base surface while being reacted with a predetermined gas and surrounded by a non-reactive gas to form a film of the spraying material having reacted with the reacting gas.

According to the invention, as the spraying material there can be used wires of such metals as iron, stainless steel, titanium, tungsten, copper, bronze and aluminum, particles of such metals as aluminum, titanium and molybdenum and particles of such ceramics as alumina, titania and zirconia, either alone or in combination.

The base may be made not only of heat-resistant materials such as metals, ceramics and concrete but also of comparatively less heat-resistant materials such as polymers, e.g., vinyl chloride, natural polymer materials, e.g., paper, and glass. Further, it may be made of materials capable of reflecting a laser beam, e.g., copper. By adequately forming films of various metals and compounds on the above base materials by spraying, it is possible to impart or improve the heat resistance, corrosion resistance, wear resistance, electric conductivity and ultra-conductivity to or of the base materials to extend the applications thereof.

As the carrier gas may be used non-reactive gases such as argon and helium gases, reactive gases such as oxygen and nitrogen gases and mixtures of these gases. Further, it is possible to use gases of hydrocarbons such as methane, hydrogen gas, carbonic acid gas and chlorine gas.

Where non-reactive gases are used as the carrier gas, the flying molten material particles will not react with oxygen or nitrogen in air. On the other hand, where reactive gases such as oxygen and nitrogen gases or gases adequately containing such reactive gases are used, the flying molten material particles undergo chemical reactions such as oxidization and nitrification.

As practical conditions of laser spraying in consideration of the power of the laser beam, kind, shape and size of the spraying material, material of the base and kind of the carrier gas, the spraying distance l (i.e., distance from the high energy density zone to the base surface as shown in FIG. 1) is selected to be 50 to 300 mm, the pressure of the carrier gas to be 2 to 8 kg/cm$^2$ and the rate of feeding of the spraying material to be 1 to 2 m/min. Under these conditions, spraying material films can be obtained which have excellent porosities of 1% or less and compare favorably with spraying material films formed by preheating the base surface.

In particular, it has been generally accepted that, in the welding and cutting of metals, the energy density of the high energy density zone should be above $10^5$ to $10^6$ W/cm$^2$. According to the invention, the spraying material can be melted sufficiently with an energy density of the order of $10^4$ W/cm$^2$, i.e., a value one order lower than the value in the prior art. This means that since the energy density of the focused portion of a 4 kW laser beam is about $6.3 \times 10^5$ W/cm$^2$, there is no need of accurately setting the spraying material feeding point to the position of the focused portion of the laser beam, but the spraying material may be fed to a point spaced apart by 30 mm (about $2.4 \times 10^4$ W/cm$^2$) from the focused portion, and this means a power reduction to 2 to 3 kW.

The spraying material can be melted with the low energy density as noted above presumably because the time of irradiation of the spraying material is extended, for it is supplied to a expanded portion of the laser beam, the temperature of the spraying material becomes higher toward the free end thereof, and dispersion by heat conduction is one-dimensional.

The temperature of the base when the spraying material film is formed varies with the conditions of spraying, but it is usually 500° C. or below. It can be readily reduced to 300° C. or below by reducing the laser beam power or enlarging the spraying distance 1 and carrier gas pressure.

Figure 4:
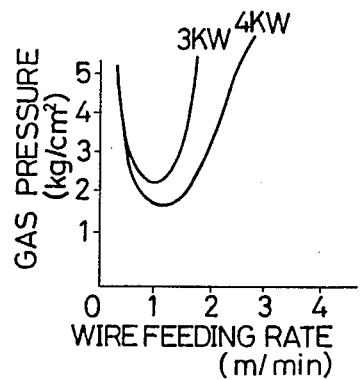
FIG. 4 is a graph showing the relationship between gas pressure and rate of feeding of spraying material (wire feeding rate) for laser power output of 3–4 kW when a titanium wire is used as the spraying material and the carrier gas is argon gas.
Figure 5:
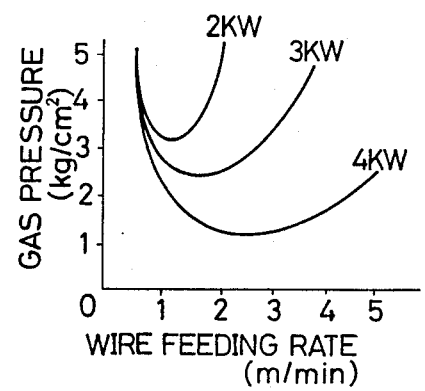
FIG. 5 is a graph showing the relationship between gas pressure and wire feeding rate for laser power output of 2–4 kW when a titanium wire is used as the spraying material and the carrier gas is nitrogen gas.
Figure 6:
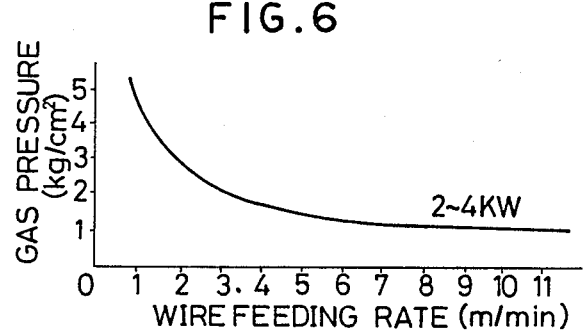
FIG. 6 is a graph showing the relationship between gas pressure and wire feeding rate for laser power output of 2–4 kW when a titanium wire is used as the spraying material and the carrier gas is oxygen gas.

The relationship between the pressure of carrier gas and rate of feeding of the spraying material when a CO$_2$ laser is used as a laser beam source and a titanium wire 0.9 mm in diameter as the spraying material, as found as a result of research and experiments conducted by the inventors, is as shown in the graph of FIG. 4 when argon gas is used as the carrier gas, as shown in the graph of FIG. 5 when nitrogen gas is used, and as shown in the graph of FIG. 6 when oxygen gas is used. By selecting conditions corresponding to upper portions of these curves, the titanium wire can be instantly melted in the high energy density zone and be rendered to a satisfactory atomized state by the carrier gas so that a spraying material film having a porosity of 0.4% or below and having excellent adhesion is formed on the base surface.

When argon gas is used as the carrier gas, as shown in FIG. 4, with laser power of 3 kW and with a wire feeding rate of 1 m/min, the pressure of the argon gas should be 2.2 kg/cm$^2$ or above. When nitrogen gas is used as the carrier gas, as shown in FIG. 5, with a laser power of 2 kW, the wire feeding rate is no more than about 2 m/min, and the gas pressure should be about 3.2 kg/cm$^2$ or above. With a laser power of 4 kW the wire feeding rate can be increased to 4 m/min with a gas pressure of 2 kg/cm$^2$. When oxygen gas is used as the carrier gas, as shown in FIG. 6, the relationship between gas pressure and wire feeding rate does not substantially vary with changes in the laser power within the range of 2 to 4 kW. When the wire feeding rate is as low as 2 m/min, the gas pressure should be about 3 kg/cm$^2$ or above. When the wire feeding rate is increased to 8 m/min or above, the gas pressure should be 1 kg/cm$^2$ or above.

In the graph noted above, the tendency that the gas pressure should be high when the wire feeding rate is low and can be reduced with increasing wire feeding rate is thought to be due to the contribution of heat generated by the reaction between the titanium wire and carrier gas to the melting of the wire.

The cause of reduction of the porosity of the sprayed film with laser beam energy is as follows. Titanium nitride particles were formed by feeding a titanium wire 0.9 mm in diameter as spraying material at the rate of 2 m/min to the high energy density zone, using nitrogen gas as carrier gas and varying the gas pressure in the range of 2 to 8 kg/cm$^2$. The titanium particles thus formed were water-cooled, and their diameter was measured. The results are as shown in Table 1.

TABLE 1

| Pressure | Diameter | | | |
|---|---|---|---|---|
| | <10 μm | 10–20 μm | 20 μm> | Median (μm) |
| 2 kg/cm$^2$ | 67.4% | 24.5% | 8.1% | 5.89 |
| 3 kg/cm$^2$ | 68.4% | 25.2% | 6.4% | 6.24 |
| 4 kg/cm$^2$ | 76.2% | 17.4% | 6.4% | 4.03 |
| 5 kg/cm$^2$ | 85.5% | 10.9% | 3.6% | 4.07 |
| 8 kg/cm$^2$ | 90.1% | 9.1% | 0.8% | 3.92 |

From the Table above it will be seen that the average particle diameter is reduced with increasing gas pressure. Considering that the diameter of the spraying particles used in plasma spraying is about 50 μm or less, the above numerical values show very small particles with a majority thereof being particles with diameters smaller by one order, i.e., of 10 μm or below. It is thus thought that the porosity of the spraying material film formed is low because of small diameter of the molten material particles.

Now, the separation of the spraying material film will be described. The peel strength cannot be measured quantitatively. Therefore, the following test was conducted.

A spraying material film formed by spraying Al$_2$O$_3$ on a Cu plate by the process according to the invention and a spraying material film formed by contrast plasma-spraying, i.e., plasma-spraying a Mo-Ni-Al alloy as ground metal on a Cu plate and then plasma-spraying Al$_2$O$_3$ on the ground alloy were used as test pieces.

The two test pieces were heated by a gas burner to 400 to 425° C., then held at this temperature for one minute, then water-cooled to normal room temperature, then heated again to 400 to 425° C., then held at this temperature for one minute and then water-cooled. The alternate heating and cooling as above were repeated at the rate of 20 to 30 cycles per hour. The separation of the plasma-spraying material film from the base began from about 400-th cycle with the contrast test piece, but no trace of separation could be noticed with the test piece according to the invention even after 2,000 cycles.

The excellent adhesion of the spraying material film obtainable according to the invention without heating the base surface is thought to be due to the small diameter of the flying molten material particles.

It will be understood from the above description that according to the invention the base surface need not be preliminarily heated, so that no device is necessary for leading the laser beam after formation of the high energy density zone to the base surface. The construction of the apparatus used can be simple. Further, since the base surface is not preheated, the base surface temperature can be readily held to be 300° C. or below when forming the spraying material film. In addition, the base may consist of a comparatively poorly heat-resistant material. Further, there is no possibility of generation of alloys between the base material and spraying material film. Further, by using a non-reactive gas as the carrier gas, a film of the spraying material can be formed on the base surface, while by using a reactive gas a film of a reaction product can be formed.

According to the invention, a high quality spraying material film with a porosity lower by one order than that of a spraying material film formed by any prior art process can be formed with a sufficiently reliable peel strength, so that it is possible to improve the quality of metals and inorganic materials and extend the scope of application of these materials.

Now, non-limitative examples of the invention will be given.

EXAMPLE 1

A laser spraying apparatus as shown in FIG. 1 was used. A 4 kW $CO_2$ laser was used as the laser beam source, and a titanium wire 0.9 mm in diameter was used as the spraying material and fed at the rate of 1.5 m/min to a high energy density zone (of about $2 \times 10^5$ W/cm$^2$). Argon gas was used as the carrier gas and jetted under a jet pressure of 5 kg/cm$^2$ from a gas jet nozzle toward the high energy density zone in a direction at right angles to the axis of the laser beam. A stainless steel plate having a sand-blasted rough surface was disposed on the extension of the axis of the gas jet nozzle at a position beyond and spaced apart 100 mm from the high energy density zone.

Figure 7:
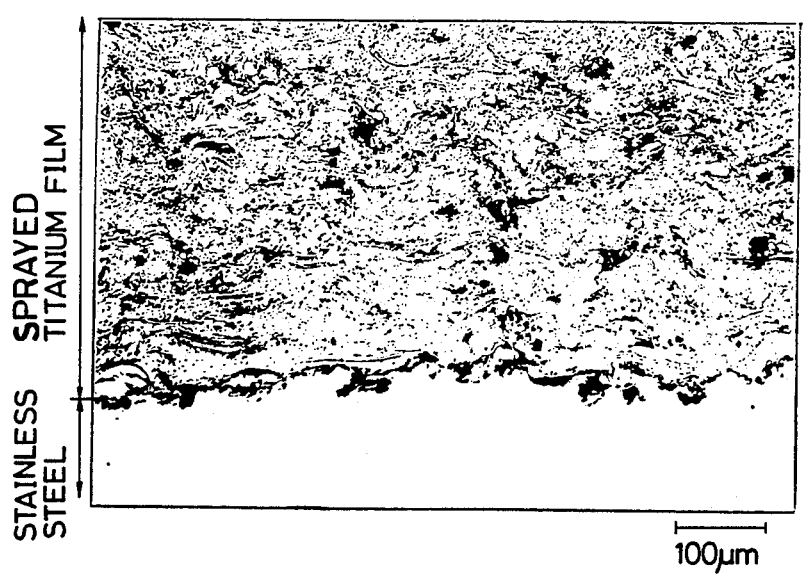
FIG. 7 is a microscopic photograph of the metal structure of a section containing an interface line between a base surface and a spraying material film.

FIG. 7 shows a microscopic photograph enlarged to 150 times of a section of the neighborhood of a base surface, on which laser spraying was carried out under the conditions noted above.

While the base surface, i.e., the surface of the stainless steel plate, was a sand-blasted rough surface, molten titanium particles were blown against the surface and perfectly pressure-deposited on the surface. Micropores were formed to a very small extent and not over the entire surface. However, a structure similar to that of soldered portions of metals was formed, and no titanium-iron alloy layer could be recognized. The porosity of the spraying material film was about 0.3%, which was a value one order lower than that of the porosity obtainable in case of the prior art plasma spraying.

EXAMPLE 2

A 4 kW $CO_2$ laser was used as the laser beam source, and a concave mirror with the surface thereof coated with gold was disposed at an angle of 45° with respect to the laser beam axis as shown in FIG. 3. The distance from the mirror surface to the high energy density zone (about $5 \times 10^4$ W/cm$^2$) was set to 150 mm.

A gas jet nozzle 3 mm in inner diameter was used. A pure titanium wire 0.9 mm in diameter was used such that it extended through the center of the gas jet nozzle, and nitrogen gas was jetted from the space surrounding the wire. The gas jet nozzle was disposed such that its outlet was directed toward the high energy density zone with its axis at right angles to the laser beam axis. A stainless steel plate with a sand-blasted rough surface was disposed so as to be normal to the axis of the gas jet nozzle at a position spaced apart 150 mm from the high energy density zone.

The spraying was done by setting the wire feeding rate to 2 m/min and nitrogen gas jet pressure to 5 kg/cm$^2$. The titanium wire was caused to fly as substantially uniform small particles toward the base surface which was moved at a speed of 500 mm/min to form a strip-like titanium nitride film on the base surface.

EXAMPLE 3

A laser spraying apparatus having the same structure as in Example 1 was used under the same conditions. A stainless steel plate was disposed as the base at a position at a spraying distance of 50 mm. The temperature of the stainless steel plate during the spraying was measured, and it was found to be about 490° C. The spraying distance was changed to 100 and 150 mm, and the temperature of the base surface to about 300 and 230° C. respectively.

In either case, an excellent spraying film was formed on the stainless steel plate.

A glass plate measuring 100 mm by 100 mm by 3 mm was disposed at a position of a spraying distance of 150 mm and was reciprocated at a speed of 480 mm/min. As a result, a strip-like titanium nitride film having a width of about 25 mm and a thickness of about 0.2 mm was formed on the glass plate. The film thus formed was adhered to the base firmly so that it did not be separated by merely scratching it with a fingernail.

The spraying of titanium was tried by using art paper in lieu of the glass plate, and a titanium nitride film could be formed on the art paper without decoloration thereof.

EXAMPLE 4

A $CO_2$ laser was used as the laser beam source, a titanium wire 0.9 mm in diameter was used as the spraying material, and nitrogen gas was used as the carrier gas. The spraying distance was set to 150 mm, and a titanium oxide film was formed on a stainless steel plate with the laser power, jet gas pressure and spraying material feeding rate set to various values. The wear resistance of each spraying material film thus formed was measured by a blast errosion test.

Figure 8:
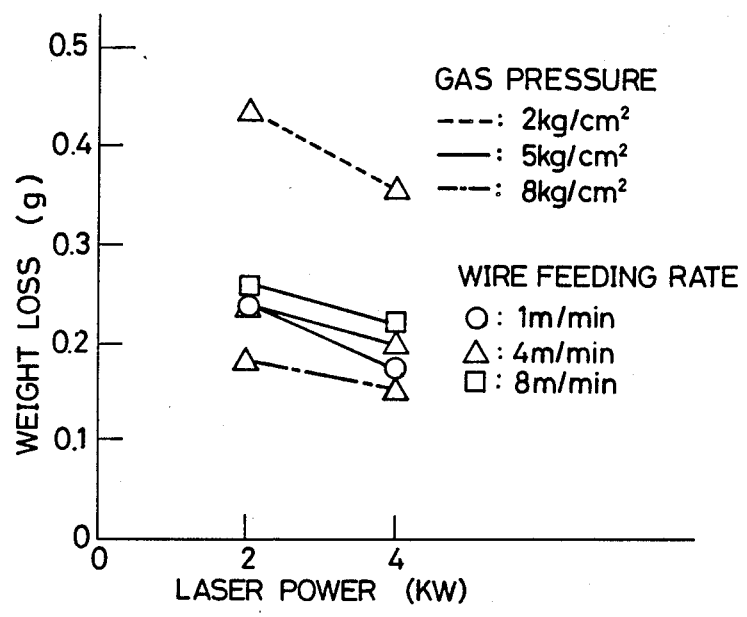
FIG. 8 is a graph showing the relationship between weight loss and laser power for various conditions in the formation of a spraying material film by the process according to the invention.

The results are shown in the graph of FIG. 8. The coupling force between adjacent particles forming the spraying material film increases with reducing weight loss in the ordinate axis of the graph.

It is seen from the graph that the quality of the film formed increases with higher laser power, lower rate of feeding of the spraying material and higher carrier gas pressure. The film can be sufficiently put to practical use if the weight loss is 0.5 g.

EXAMPLE 5

A 4 kW $CO_2$ laser was used as the laser beam source, a titanium wire 0.9 mm in diameter was used as the spraying material, and argon gas under a jet gas pressure of 5 kg/cm$^2$ was used as the carrier gas. A stainless steel plate was disposed as the base at a position of a spraying distance of 100 mm. A four-layer titanium film was formed on the stainless steel plate by moving the same at a speed of 50 cm/min, and the porosity of the film was measured.

Figure 9:
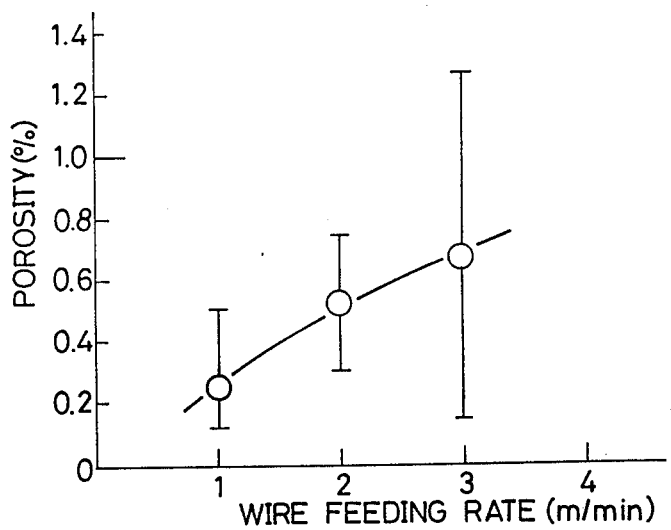
FIG. 9 is a graph showing the relationship between the porosity of spraying material film formed according to the invention and wire feeding rate.

The results are shown in the graph of FIG. 9. It will be seen that the porosity decreases with slower rate of feeding of the titanium wire.

Figure 10:
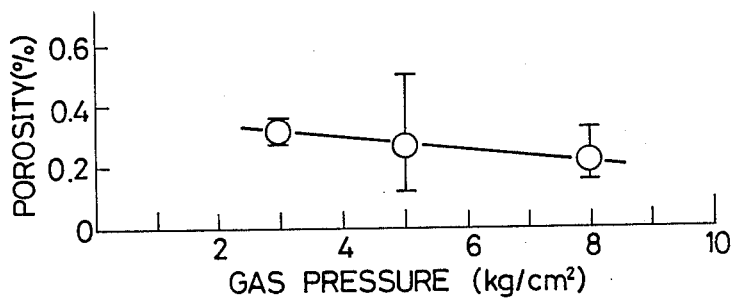
FIG. 10 is a graph showing the relationship between the porosity of spraying material film formed according to the invention and carrier gas pressure.

Then, the porosity of the four-layer titanium film formed on stainless steel plate with the titanium wire feeding rate set to 1 m/min and argon gas pressure set to various values was measured. The results are shown in the graph of FIG. 10. The porosity decreased with increasing gas pressure.

Figure 11:
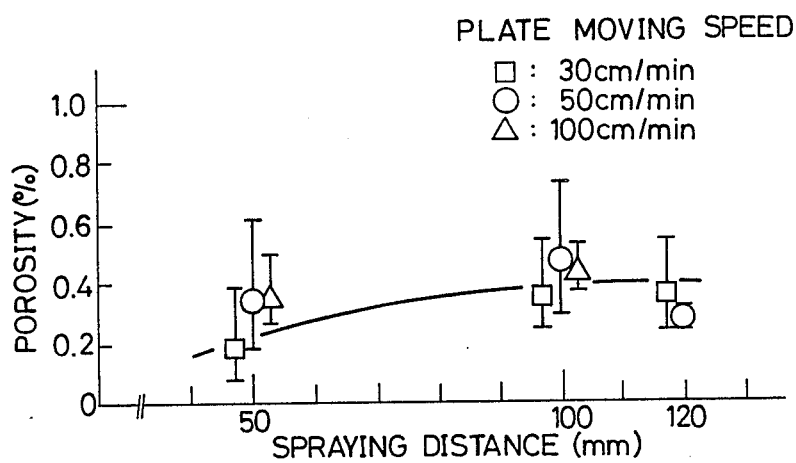
FIG. 11 is a graph showing the relationship between the porosity of spraying material film formed according to the invention and spraying distance for plate moving speed of 30-100 cm/min.

Further, the porosity of the four-layer titanium film formed on a stainless steel plate with the argon gas pressure set to 5 kg/cm$^2$ and the spraying distance and speed of movement of the stainless steel plate set to various values was measured. The results are shown in the graph of FIG. 11. The porosity decreased with decreasing spraying distance.

In either case, it will be seen that the spraying material film obtainable according to the invention is excellent from the consideration that the porosity of the spraying material films obtainable by any of the well-known spraying processes is over 1.0%.

EXAMPLE 6

A laser spraying apparatus having the same structure as in Example 1 was used. The spraying distance, i.e., the distance between the base surface and the high energy density zone, was set to 100 mm. A sandblasted rough surface of a stainless steel plate was used as the base surface, a pure aluminum wire having a diameter of 1.2 mm was used as the spraying material, and argon gas was used as the carrier gas.

Laser spraying was carried out with the output of a $CO_2$ laser varied to 2 kW, 3 kW and 4 kW, with the wire feeding rate varied in the range of 0.5 to 5 m/min and with the argon gas jet pressure varied in the range of 0.5 to 5 kg/cm$^2$ to cause the pure aluminum wire to continuously fly in the form of small particles and to be deposited in the form of a pure aluminum film on the sandblasted rough surface of the stainless steel plate.

Figure 12:
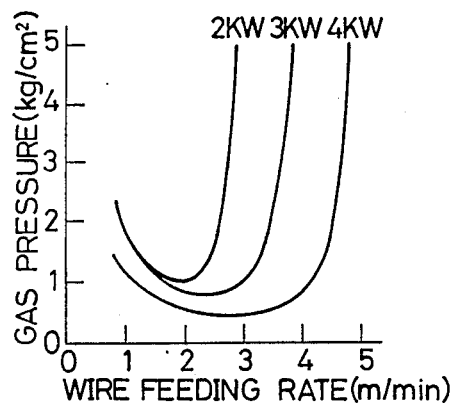
FIG. 12 is a graph showing the relationship between gas pressure and wire feeding rate for laser power output of 2-4 kW when a pure aluminum wire is used as the spraying material and the carrier gas is argon gas.

The results are shown in the graph of FIG. 12, in which the respective portions above the curves represent the conditions under which the films were well deposited on the base surface, and from which it is found that the laser output and wire feeding rate have a close relation to each other and that good deposition of a pure aluminum film on the base surface was obtained at the wire feeding rate of not more than 2.5 m/min when the laser output was 2 kW, at not more than 3.5 m/min when the output was 3 kW and at not more than 4.5 m/min when the output was 4 kW, respectively.

Figure 13:
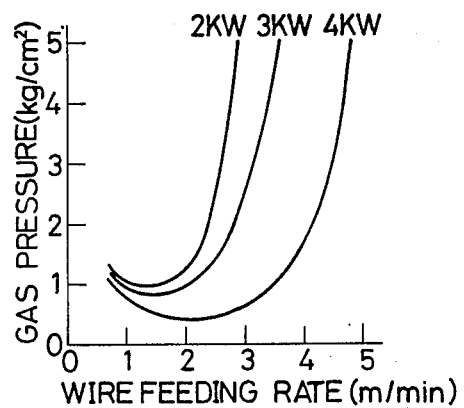
FIG. 13 is a graph showing the relationship between gas pressure and wire feeding rate for laser power output of 2-4 kW when a pure aluminum wire is used as the spraying material and the carrier gas is nitrogen gas.
Figure 14:
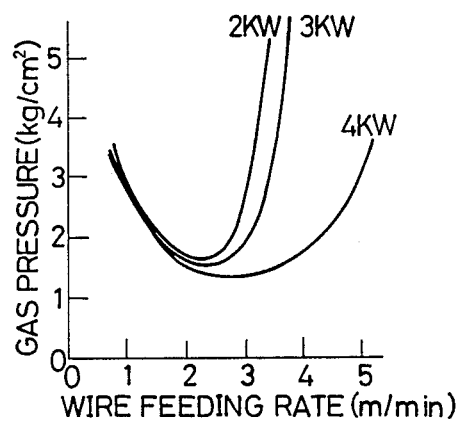
FIG. 14 is a graph showing the relationship between gas pressure and wire feeding rate for laser power output of 2-4 kW when a pure aluminum wire is used as the spraying material and the carrier gas is oxygen gas.

Laser spraying was effected under the same conditions as described above except for use of nitrogen gas and oxygen gas as the carrier gas in place of the argon gas to deposit an aluminum nitride film and an aluminum oxide film on the base surfaces. The results are shown in FIGS. 13 and 14, respectively.

EXAMPLE 7

Laser spraying was carried out using a laser spraying apparatus of the same structure as in Example 1 and a 4 kW $CO_2$ laser, also using a tungsten wire 1.0 mm in diameter as the spraying material, a stainless steel plate (SUS 304) as the base and argon gas as the carrier gas, and setting the wire feeding rate to 1 m/min, the argon gas pressure to 5 kg/cm$^2$ and the spraying distance to 100 mm. As a result, a tungsten film was well deposited on the surface of the base.

EXAMPLE 8

A 4 kW $CO_2$ laser was used as the laser beam source, and argon gas was jetted under a pressure of 5 kg/cm$^2$ from a position normal to the laser beam axis. A spraying material composed of composite tungsten carbide-cobalt fine particles having diameters of 20 to 40 μm and having the cobalt content of 12% by weight was fed to the high energy density zone from a position of 45° relative to the laser beam axis at the feeding rate of 50 g/min.

An aluminum base plate was disposed at a distance of 50 mm from the high energy density zone and moved at a speed of 77 cm/min. As a result, a two-layer film having a thickness of about 0.5 mm was well deposited on the surface of the base plate.

Laser spraying was effected by using alumina particles and zirconia particles in place of the composite tungsten carbide-cobalt fine particles. As a result, films were well deposited on the aluminum base plates, respectively similarly to the case using the composite fine particles.

What is claimed is:

1. A laser spraying process comprising the steps of:
    irradiating a laser beam with a converging lens or a mirror, thereby forming a high energy density zone on the beam axis;
    feeding a spraying material to said high energy density zone in a direction of crossing said beam axis;
    supplying a carrier gas so that a gas to a base surface axis is normal to said base surface and perpendicularly crosses said beam axis, thereby forming said spraying material into fine particles and blowing said fine particles with a stream of said carrier gas against said base surface to form a film of said fine particles on said base surface.

2. The laser spraying process according to claim 1, wherein said spraying material is a member of a group consisting of metals and mixtures of metals and inorganic materials.

3. The laser spraying process according to claim 1, wherein said spraying material is fed in the form of a wire or particles.

4. The laser spraying process according to claim 1, wherein the gas of said carrier gas stream is a member of a group consisting of non-reactive gases including argon and helium gases, reactive gases including oxygen and nitrogen gases and mixtures of said non-reactive and reactive gases.

5. The laser spraying process according to claim 1, wherein a plurality of spraying material feed nozzles are provided to feed said spraying material simultaneously from said feed nozzles to said high energy density zone.

6. A laser spraying process comprising the steps of:
    providing a plurality of spraying material feed nozzles and feeding thereto a spraying material to and melting it in a high energy density zone formed by converging a laser beam therein with a converging lens or a mirror and blowing the molten spraying material as particles with a carrier gas stream against a base surface to form a film of said spraying material on said surface, wherein said carrier gas stream has an axis set to be normal to said base surface, and the axis of said laser beam in said high energy density zone is set to cross said axis of said carrier gas stream.

* * * * *